J. Gardner,
Cocoanut Grater,

№ 67,529. Patented Aug. 6, 1867.

Witnesses;

Inventor;
J. Gardner

United States Patent Office.

JOHN GARDNER, OF PHILADELPHIA, PENNSYLVANIA.

Letters Patent No. 67,529, dated August 6, 1867.

---

IMPROVED COCOA-NUT CUTTER AND GRATER.

---

The Schedule referred to in these Letters Patent and making part of the same.

---

TO ALL WHOM IT MAY CONCERN:

Be it known that I, JOHN GARDNER, of Philadelphia, in the county of Philadelphia, and State of Pennsylvania, have invented a new and improved Device for Preparing or Reducing Cocoa-Nuts; and that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved machine for preparing the meat of the cocoa-nut, grating and slicing the same for the use of confectioners, and it consists of a hollow cylinder placed on a rotating shaft and fitted within a box or receptacle provided with a top or cover having hoppers, and all arranged in such a manner that the cocoa-nut meat may be grated, cut in thin slices, or into thin narrow strips, as may be required. In the accompanying sheet of drawings—

Figure 1:
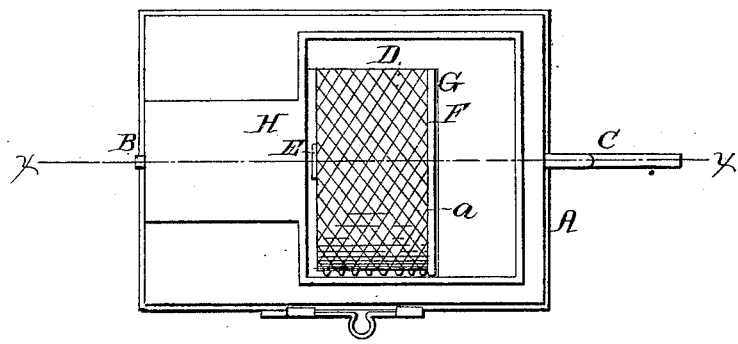

Figure 1 is a plan or top view of my invention.

Figure 2:
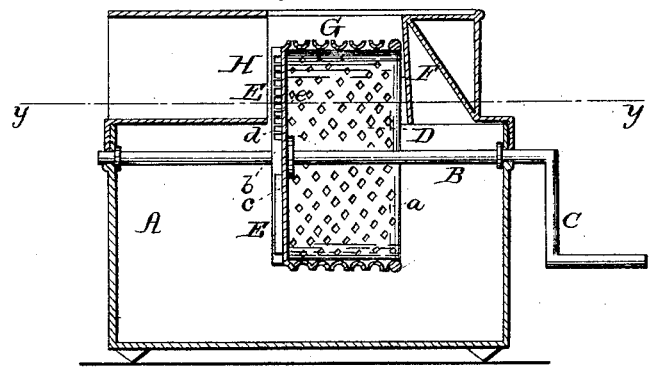

Figure 2, a vertical section of the same, taken in the line $x\ x$, fig. 1.

Figure 3:
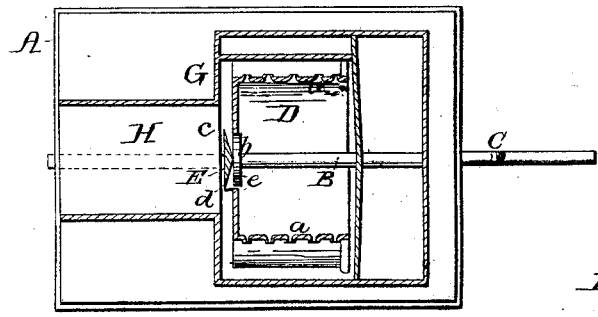

Figure 3, a horizontal section of the same, taken in the line $y\ y$, fig. 2.

Similar letters of reference indicate like parts.

A represents a box or receptacle, through which a shaft, B, passes horizontally, said shaft having a crank, C, at one end for the convenience of turning it. On this shaft B there is secured a hollow cylinder, D, constructed of sheet metal, open at one end, and having its periphery punched from its inner side with holes $a$ to form a grater. The closed end of the cylinder D has radial slots $b$ made in it, over which knives E are secured, the latter being a short distance out from the end of the cylinder, so as to leave a space or throat for the cut cocoa-nut to pass through. One side $c$ of these cutters has a straight or continuous cutting edge, but the other side $d$ has a series of small cutters $e$ fitted in the space between said edges and the end of the cylinder, as shown clearly in fig. 2. F represents the cover or top of the box A, which has two hoppers G H, the former, G, being directly over the cylinder D, and receiving the upper portion of the same, and the latter hopper, H, having a horizontal position, so that the cocoa-nut may be placed in it and pressed against the knives E in the end of the cylinder. When the cylinder D is turned in one direction, so that the sides $c$ of the cutters will act against the meat of the cocoa-nut, the latter will be cut in thin, broad slices, and when the cylinder is turned in the opposite direction, the sides $d$ and small knives or cutters $e$ will act against the meat of the cocoa-nut and cut the same into thin narrow strips.

When the cocoa-nut is to be grated it is placed in the hopper G, so that the perforated periphery of the cylinder will act against it.

The invention is an excellent one for confectioners, as it may be manufactured and sold at a very moderate cost, and admits of the cocoa-nut meat being reduced in different forms, as may be desired.

Having thus described my invention, I claim as new, and desire to secure by Letters Patent—

1. The hollow cylinder D provided with a perforated periphery to form a grater, in combination with the knives E and cutters $c$ at one end of the same, arranged in the manner substantially as and for the purpose set forth.

2. The hoppers G H on the top or cover F of the box, in combination with the hollow cylinder D, with its knives and cutters at one end, and its perforated periphery, all arranged substantially as and for the purpose specified.

The above specification of my invention signed by me this 28th of June, 1867.

JOHN GARDNER.

Witnesses:
WM. F. MCNAMARA,
J. A. SERVICE.